United States Patent

[11] 3,589,601

[72] Inventor David J. Schaffer
Tempe, Ariz.
[21] Appl. No. 790,904
[22] Filed Jan. 10, 1969
[45] Patented June 29, 1971
[73] Assignee The Garrett Corporation
Los Angeles, Calif.

[54] FLUIDIC BINARY COUNTER
7 Claims, 5 Drawing Figs.

[52] U.S. Cl. .......... 235/201
[51] Int. Cl. .......... G06m 1/12
[50] Field of Search .......... 235/201

[56] References Cited
UNITED STATES PATENTS

| | | | |
|---|---|---|---|
| 3,190,554 | 6/1965 | Gehring et al. | 235/201 |
| 3,227,368 | 1/1966 | Jacoby | 235/201 |
| 3,259,314 | 7/1966 | Hatch | 235/201 |
| 3,342,197 | 9/1967 | Phillips | 235/201 |
| 3,473,546 | 10/1969 | Bellman | 235/201 |

*Primary Examiner*—Richard B. Wilkinson
*Assistant Examiner*—Lawrence R. Franklin
*Attorneys*—Herschel C. Omohundro and John N. Hazelwood

ABSTRACT: The subject fluidic binary counter includes a bistable fluid amplifier with '0' and '1' state output ports, a pair of fluidic AND gates, a pair of fluidic NOT elements, a signal generator, and passages connecting the output port of one AND gate with the set control signal port of the amplifier and the output port of the other AND gate with the reset control signal port. The '0' state output port of the amplifier is connected with the inlet port of one NOT element, while the '1' state output port is connected with the inlet port of the other NOT element. The output ports of the NOT elements are connected, respectively, with one input port of one or the other of the AND gates. The signal line from the signal generator is connected with the remaining input ports of the AND gates and the control ports of the NOT elements. The introduction of a signal from the generator shifts the bistable amplifier from the instant state to the other state where it will remain until the introduction of the next signal.

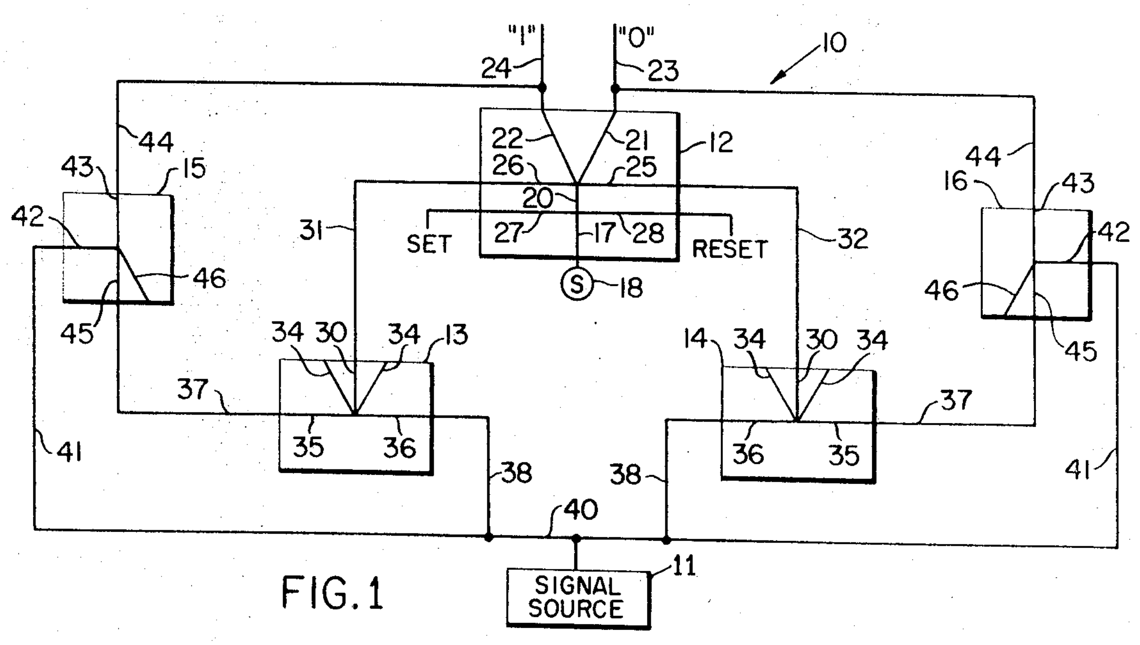
FIG. 1
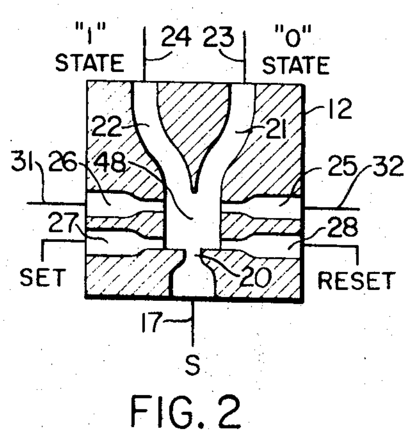
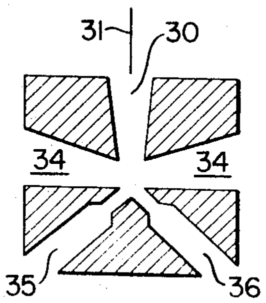
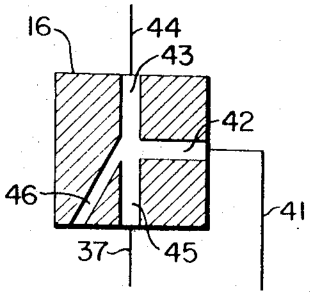
FIG. 2 FIG. 3 FIG. 4
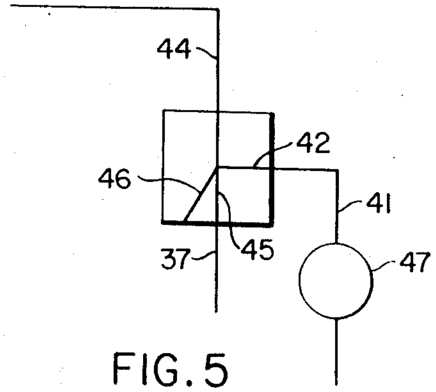
FIG. 5
INVENTOR.
DAVID J. SCHAFFER
BY
Herschel C. Omohundro
ATTORNEY

FLUIDIC BINARY COUNTER

SUMMARY

This invention relates generally to the fluidic art and more particularly to a system forming one stage of a fluidic binary counter.

The object of this invention is to combine selected known fluidic digital elements in a new and unique manner to produce a system which will receive signals from a suitable generator and provide count pulses which may be employed to actuate a recording device or another stage of a counter having a desired number of digits.

Another object of the invention is to provide a fluidic binary counter of extreme simplicity with the ability to count to as low a frequency as desired.

Another object is to provide a binary counter having a single bistable amplifier or flip-flop and sets of substantially duplicative fluidic elements responsive to input signals from a source such as a pulse generator to apply control signals of either short or long duration to the amplifier to cause it to switch output ports, each output signal being maintained, whether the input signal is sustained or not, until this input signal is removed and the succeeding input signal is received from the generator.

A further object of the invention is to provide the binary counter stage of the preceding paragraph in which the fluidic elements of the duplicative sets consist of AND gates and NOT elements so connected that the latter will direct feedback signals from the amplifier to the AND gates to be combined with signals from the generator and transmit control signals to the amplifier, the NOT elements also receiving signals from the generator to interrupt the application of the feedback signals to the AND gates after the purposes thereof have been accomplished.

A still further object of the invention is to provide delay means in the lines leading to control ports in the NOT elements to insure the application of feedback signals to the AND gates when the input signals from the generator are initially received thereby.

Other objects and advantages of the invention will be apparent from the following description of the form of the binary counter system selected for illustration in the accompanying drawing.

IN THE DRAWINGS

FIG. 1 is a logic diagram of a system or circuit embodying the principles of the present invention;

FIG. 2 is a symbolic view of a bistable amplifier which may be used in the system of FIG. 1;

FIG. 3 is a similar view of an AND gate suitable for use in the system of FIG. 1;

FIG. 4 is also a similar view of a NOT element which may be used in the system; and FIG. 5 is a diagrammatic view of a portion of a slightly modified system.

DESCRIPTION

Specific reference to FIG. 1 of the drawings discloses a simple binary counter system embodying the subject matter of the invention. The elements in this system are shown symbolically in accordance with the custom of the art. The system is designated generally by the numeral 10 and includes a signal source or generator 11. A bistable fluid amplifier 12, (commonly termed "flip-flop") forms one of the main elements of the system. Also included is a pair of AND gates 13 and 14 and a pair of NOT elements 15 and 16. These elements are connected by fluid lines or other ducts.

The amplifier 12 has an input passage 17 communicating with a source 18 of fluid pressure, the nozzle 20 of the amplifier creating a beam which is directed alternately through output passages 21 and 22. These passages lead to ducts 23 and 24. In the following description these ducts may, respectively, be designated as conducting 'O' state and '1' state signals. The amplifier 12 also has control ports 25 and 26 through which control signals are applied to the beam to shift it between the '0' state and '1' state output ports 21 and 22. The amplifier may further be provided with additional control ports 27 and 28 herein designated as 'set' and 'reset' control ports. Signals for effecting setting and resetting operations of the amplifier may be manually introduced through these ports. The amplifier 12 is of the bistable type in which the beam locks on to a sidewall of either output port and remains in this condition until a suitable control signal is applied to cause the beam to shift to the other output port.

The system 10 also includes the AND gates 13 and 14 each of which has an output port 30, such port of AND gate 13 being connected by line 31 with control port 26 while the output port of gate 14 is connected by line 32 with control port 25 of the amplifier 12. The AND gates 13 and 14 are illustrated as being of the passive type; however, active gates may be employed equally as well.

Each AND gate has a pair of control ports 35 and 36. As is known in the fluidic art, signals must be simultaneously applied to the control ports 35 and 36 for an output pulse to issue from the output port 30 of an AND gate, otherwise signals supplied to either control port will flow through a vent port 34. Control signal lines 37 lead to control ports 35, while control signal lines 38 lead to the control ports 36. Lines 38 communicate with a manifold 40 which is fed with signals from the source 11. Additional signal lines 41 lead from the manifold to the control ports 42 of the NOT elements 15 and 16. These elements are substantially conventional and contain input ports 43 which are connected by lines 44, through which feedback signals are supplied to the NOT elements, to the output ports of the amplifier 12. The NOT elements have output ports 45 through which the feedback signals are normally directed when such signals are supplied to the NOT elements and no signals are supplied to the control ports 42. The output ports 45 are connected by signal lines 37 with the control ports 35 of the AND gates. The NOT elements operate in the usual manner in that when feedback signals are supplied to the inlet ports these signals will flow through the normal outlet ports. When, however, control signals are applied to the ports 42, the feedback signals are directed to vent passages 46 and exhaust to the ambient atmosphere or are returned to the source of fluid pressure.

In the operation of the fluidic binary control system illustrated, fluid pressure source 18 will supply fluid to the amplifier 12. Such fluid will be converted by the nozzle 20 into a fluid beam which will be received by one or the other output passages 21 or 22. Assuming that the beam is being received by port 21, a flow or '0' signal will be established in line 23. At this time a feedback flow will be conducted through line 44 to NOT element 16. This feedback signal will flow through output port 45 and will pass through line 37 to control port 35 of AND gate 14. Since this type of fluidic device requires two signals, feedback fluid from NOT element supplied to the AND gate will flow to vent 34 in the absence of a signal in control port 36. When, however, a signal is supplied by the source 11, such signal impulse will flow through line 38 to control port 36 of AND gate 14 and the presence of two signals will then cause fluid flow through outlet 30 of AND gate 14, and a signal will be conducted by passage 32 to control port 25 of the amplifier 12. When this condition takes place, the beam in amplifier 12 will be switched from output port 21 to output port 22. A '1' state signal will then flow through passage 24. Flow through passages 23 and 24 may be employed to actuate suitable recording devices. In certain instances, where a counter having a greater number of digits is desired, the outputs from amplifier 12 may lead to other similar fluid binary counter stages. When the beam switches from output port 21 to output port 22, the feedback to NOT element 16 will be terminated. When a signal from source 11 is supplied, such signal will also flow through line 41 leading to NOT element 15. This signal will flow through control port 42 of NOT element 15, and when a feedback signal through line 44 leading from output port 22 of the amplifier to NOT element 15 is initiated, the signal in control port 42 will deflect the feedback signal to vent 46 of element 15. This arrangement will prevent AND gate 13 from applying a control signal to the amplifier 12 and the output or count signal through output port 22 will be maintained. Such signal will be continued even though the pulse from the source 11 is discontinued.

When the next succeeding pulse from source 11 is supplied, the feedback signal will still be issuing from output port 22 and applied through NOT element 15, line 37, to control port 35 of AND gate 13. The simultaneous application of signals to the control ports 35 and 36 of AND gate 13 will cause the direction of a signal through line 31 to the control port 26 of the amplifier 12. This signal will cause the beam to shift from output port 22 to output port 21 where it will remain until the next succeeding impulse is supplied by the source 11. As previously pointed out, the output of the amplifier 12 will continue or be maintained even though the signal from source 11 is interrupted. Each new signal from the source will cause the beam of the amplifier to shift from its instant state to its opposite state.

Use is made of the time period between the initiation of an impulse by source 11 and the interruption of the feedback signal by such impulse to effect the generation of a control signal by the AND gates. In the event a sufficient time period does not exist, the system may be modified, as shown in FIG. 5, by the incorporation in line 41 of a capacitance device 47 which will delay application of the pulse from source 11 to the control port 42 of the NOT element until the feedback signal and impulse from source 11 effect the operation of the AND gate.

The various fluidic elements employed in the system shown in FIG. 1 are illustrated in more detail in FIGS. 2 to 4, inclusive. In FIG. 2, a fluidic bistable amplifier is shown. The reference numeral utilized are the same as those applied in FIG. 1 to designate the various parts of the amplifier. As shown, the amplifier includes the inlet 17 and nozzle 20 which directs the beam into a reaction chamber 48 from which output passages 21 and 22 lead to passages 23 and 24. Control ports 25 and 26 with their control nozzles are also illustrated. The set and reset ports 27 and 28 are disposed at the sides of the nozzle 20 in the usual manner.

An AND gate is shown in FIG. 3. The gate illustrated corresponds to the passive AND gate 13 of the system shown in FIG. 1 and includes the control inlets 35 and 36, vents 34, and output port 30, line 31 leading from the latter.

In FIG. 4, a typical NOT element is shown, this element corresponding to element 16 of FIG. 1. Line 44 leads to the inlet 43, while line 37 leads from the outlet 45. As previously pointed out, in the absence of a signal in control port 42, fluid supplied to the inlet 43 will flow directly through the NOT element through outlet 45 to line 37. When a signal is supplied to control port 42 through line 41, the feedback signal entering inlet 43 will be directed through vent 46.

It will be obvious from the foregoing that a fluidic binary counter system has been shown and described. The system is composed of a minimum number of fluidic elements having a single bistable fluidic amplifier, dual pairs of control elements, each pair including an AND gate and a NOT element. Suitable fluid passages connect these elements and a source of signals which may be of regularly occurring frequency or otherwise, and the system will supply output passages with counting impulses to operate suitable recording devices. If the input signal is a known frequency, a fluidic timer may be produced. With the system shown, the output in either output line will be maintained until the next succeeding pulse is provided by the signal source.

I claim:

1. A binary counter which is independent of time comprising:

a. a first means for generating a series of signals to be counted;

b. a bistable fluid amplifier having '0' state and '1' state output ports, and lines leading from such ports to conduct feedback signals indicative of such states, said amplifier having control jet inlet ports for receiving control signals to shift the amplifier between '0' state and '1' state and vice versa; and c. a plurality of frequency and temperature insensitive passive logic elements connected with said first means, said control jet inlet ports and said feedback signal lines, certain of said logic elements receiving and combining signals from said first means and said feedback signal lines and directing control signals to said control jet inlet ports of said amplifier to shift the amplifier between '0' and '1' state outputs, signals from said first means received by other logic elements serving to interrupt the application of said feedback signals to said certain logic elements.

2. A binary counter which is independent of time comprising:

a. A first means for generating a series of signals to be counted;

b. a bistable fluid amplifier having '0' state and '1' state output ports, said amplifier alternately producing feedback signals indicative of such states;

c. a plurality of first fluid logic elements of the passive AND type connected with said amplifier to apply control signals thereto to shift the same between the '0' state and '1' state, and vice versa; and d. additional fluid logic elements connected between said output ports and said first fluid logic elements, said additional elements being responsive to signals from said first means and said feedback signals to control the application of control signals to said amplifier by said first fluid logic elements.

3. The binary counter of claim 2 in which two first fluid logic elements are provided, the output of one element being applied as a control signal to place the amplifier in one state and the output of the other element being applied to place the amplifier in the other state.

4. The binary counter of claim 3 in which the additional fluid logic elements are of the NOT type connected with said first means, the output ports of said amplifier, and said AND elements in a manner to cause the signals from the first means to interrupt the application of the state indicating signals of said amplifier to said first fluid logic elements.

5. A binary counter which is independent of time comprising:

a. a first means for generating a series of signals to be counted;

b. a bistable fluid amplifier having '0' state and '1' state output ports, said amplifier alternately producing signals indicative of such state;

c. two AND type fluid logic elements, connected with said first means to receive signals therefrom and with said amplifier to cause the output of one AND element to apply a control signal to the amplifier to place it in the '0' state and the output of the other element to apply a control signal to the amplifier to place it in the '1' state; and d. two NOT type fluid logic elements connected with said first means to receive signals therefrom, one NOT type element being connected between the '0' state output of said amplifier and the AND type element connected to place the amplifier in the '1' state and the other NOT type element being connected between the '1' state output of said amplifier and the other AND type element.

6. The binary counter of claim 5 in which the bistable fluid amplifier has a control signal port for receiving a set signal and a control signal port for receiving a reset signal; each of said AND type logic elements has an output port communicating with one of said control signal ports and a pair of input ports, one input port of each AND element being connected with said signal generating means; each of said NOT type fluid logic elements has an inlet port communicating with an output port of said amplifier, a normal output port communicating with one input port of an AND type logic element, and a control port communicating with said signal generating means, the admission of signals from said signal generating means to the control ports of said NOT type fluid logic elements interrupting the passage of signals from the inlets of said NOT elements to the normal output ports thereof.

7. The binary counter of claim 6 in which a fluidic capacitance means is disposed between the control ports of said NOT type fluid logic elements and said signal generating means to delay the response of said NOT elements to the signals from said generating means for a predetermined time period.